US009434468B2

(12) United States Patent
Van Zyl

(10) Patent No.: US 9,434,468 B2
(45) Date of Patent: Sep. 6, 2016

(54) WING CONTROL SYSTEM

(75) Inventor: Louwrens Hermias Van Zyl, Pretoria (ZA)

(73) Assignee: CSIR, Pretoria (ZA)

( * ) Notice: Subject to any disclaimer, the term of this patent is extended or adjusted under 35 U.S.C. 154(b) by 185 days.

(21) Appl. No.: 13/817,987

(22) PCT Filed: Jul. 14, 2011

(86) PCT No.: PCT/IB2011/053144
§ 371 (c)(1),
(2), (4) Date: Feb. 20, 2013

(87) PCT Pub. No.: WO2012/023062
PCT Pub. Date: Feb. 23, 2012

(65) Prior Publication Data
US 2013/0146705 A1 Jun. 13, 2013

(30) Foreign Application Priority Data
Aug. 20, 2010 (ZA) .................................. 2010/05967

(51) Int. Cl.
*B64C 13/28* (2006.01)
*B64C 13/34* (2006.01)
*B64C 9/00* (2006.01)
(52) U.S. Cl.
CPC .................. *B64C 13/34* (2013.01); *B64C 9/00* (2013.01); *B64C 13/28* (2013.01)
(58) Field of Classification Search
CPC ................................. B64C 13/28; B64C 3/50
USPC .............................................. 244/99.2, 99.3
See application file for complete search history.

(56) References Cited

U.S. PATENT DOCUMENTS

| 1,971,592 | A |   | 8/1934  | Zaparka       |             |
|-----------|---|---|---------|---------------|-------------|
| 3,203,275 | A |   | 8/1965  | Hoover        |             |
| 4,286,761 | A | * | 9/1981  | Musgrove      | B62D 3/02   |
|           |   |   |         |               | 244/215     |
| 4,518,196 | A | * | 5/1985  | Forster et al.| 296/204     |
| 4,932,929 | A | * | 6/1990  | Capewell      | B64C 13/34  |
|           |   |   |         |               | 244/99.2    |
| 4,979,700 | A | * | 12/1990 | Tiedeman      | B64C 13/34  |
|           |   |   |         |               | 244/198     |

(Continued)

FOREIGN PATENT DOCUMENTS

EP          0 162 312 A1      11/1985

OTHER PUBLICATIONS

International Search Report issued in PCT/IB2011/053144 mailed on Feb. 28, 2012 (2 pages).

(Continued)

*Primary Examiner* — Brian M M'Ohara
*Assistant Examiner* — Keith L Dixon
(74) *Attorney, Agent, or Firm* — Osha Liang LLP

(57) ABSTRACT

The invention provides a wing control system aimed at countering the aeroelastic effect of twisting of a length of wing of an aircraft due to dynamic air pressure acting on an aileron of the wing. The wing control system includes a shaft extending along the length of wing and actuation means responsive to aileron control inputs to induce a variable torque T in the shaft. Outboard of the length of wing, the system operatively transfers T partially to the aileron to pivot the aileron and partially to the wing at an outboard end of the length of wing to counter twisting of the length of wing due to dynamic air pressure on the aileron. Inboard of the length of wing, the system operatively transfers T to the aircraft, e.g. to its fuselage, thereby effectively balancing the sum of the moments transferred respectively to the aileron and the wing.

6 Claims, 5 Drawing Sheets

(56) References Cited

U.S. PATENT DOCUMENTS

| | | | | |
|---|---|---|---|---|
| 5,897,079 | A * | 4/1999 | Specht et al. | 244/118.5 |
| 6,027,072 | A * | 2/2000 | Black et al. | 244/118.5 |
| 6,443,034 | B1 * | 9/2002 | Capewell | B64D 45/0005 244/99.3 |
| 6,491,254 | B1 * | 12/2002 | Walkinshaw et al. | 244/118.5 |
| 6,491,261 | B1 * | 12/2002 | Blake | B64C 5/08 244/113 |
| 6,585,189 | B1 * | 7/2003 | Smallhorn | 244/118.5 |
| 6,705,570 | B1 * | 3/2004 | Degenholtz | B64C 9/02 244/213 |
| 6,802,475 | B2 * | 10/2004 | Davies | B64C 13/32 244/220 |
| 7,464,896 | B2 * | 12/2008 | Carl | B64C 5/10 244/99.2 |
| 7,641,145 | B2 * | 1/2010 | Steinberg | B64C 13/30 244/99.3 |
| 7,690,597 | B2 * | 4/2010 | Cavalier | B64C 13/28 244/213 |
| 7,920,382 | B2 * | 4/2011 | Uluc et al. | 361/696 |
| 7,984,880 | B2 * | 7/2011 | Gomes | B64C 13/38 244/223 |
| 8,262,023 | B2 * | 9/2012 | Kofinger et al. | 244/119 |
| 8,312,783 | B2 * | 11/2012 | Mckay | B64C 13/28 244/99.2 |
| 8,328,607 | B2 * | 12/2012 | Reisbach | 454/76 |
| 8,393,573 | B2 * | 3/2013 | Horstman et al. | 244/118.5 |
| 8,602,088 | B2 * | 12/2013 | Solntsev et al. | 165/41 |
| 2001/0042612 | A1 * | 11/2001 | Hasenoehrl et al. | 165/80.3 |
| 2010/0282899 | A1 * | 11/2010 | Heintjes | B64C 13/28 244/99.5 |

OTHER PUBLICATIONS

International Preliminary Report on Patentability issued in PCT/IB2011/053144 completed on Oct. 30, 2012 (6 pages).

Written Opinion of the International Searching Authority w/translation issued in PCT/IB2011/053144 mailed on Feb. 28, 2012 (6 pages).

* cited by examiner

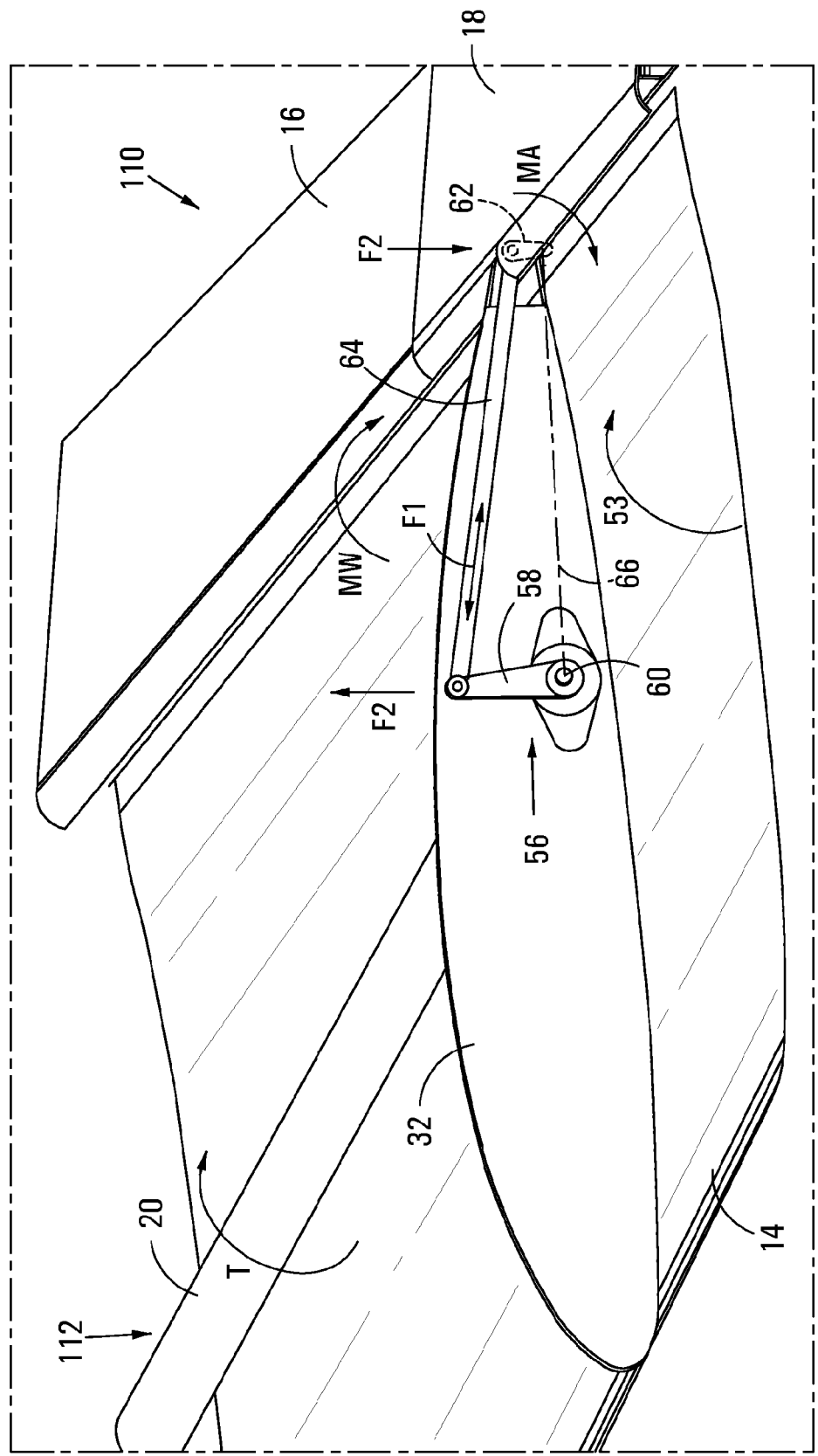

WING CONTROL SYSTEM

THIS INVENTION relates to a wing control system.

The invention relates, more particularly, to a wing control system for an aircraft.

Those knowledgeable on aeroelastic effects on aircraft wings know that, when an aileron is pivoted in a particular rotational direction relative to a wing of an aircraft during forward motion of the aircraft, dynamic air pressure acting on the aileron induces a moment on the wing in the opposite rotational direction. This moment induces twisting of the wing. In extreme cases, so-called aileron reversal may occur, meaning that an effect of a control input to an aileron is the opposite of the intended effect.

The wing control system of the present invention aims to effect actuation of an aileron on a wing whilst at least ameliorating twisting of the wing.

According to the invention there is provided a wing control system operatively installed on an aircraft, the aircraft including a wing including an aileron and a length of wing in which dynamic air pressure on the aileron, when pivoted during forward motion of the aircraft, would tend to induce twisting, the system including:

a shaft extending along the length of wing and including an outboard end and an inboard end;

actuation means responsive to aileron control inputs received from an aileron control system of the aircraft to induce a variable torque T in the shaft;

outboard moment transfer means for transferring the torque T from the outboard end of the shaft partially as a moment MA to the aileron and partially as a moment MW to the wing at an outboard end of the length of wing, with the moment MW being in the same direction as the moment MA to counter twisting of the length of wing due to dynamic air pressure on the aileron, when pivoted during forward motion of the aircraft, and with the moments MA and MW together balancing the torque T; and inboard moment transfer means for transferring the torque T from the inboard end of the shaft to the aircraft at a position inboard of the length of wing as a moment MF, with the moment MF being directionally opposite to the moments MA and MW and with the moment MF balancing the torque T.

Clearly, the moments MA, MW, and MF will operatively vary with speed of the aircraft.

The outboard moment transfer means may be configured to operatively induce a ratio of moments MA:MW within a range 1:2 to 1:8. This ratio may, more particularly, be within a range 1:2 to 1:6. In practice, it will be aimed to optimize this ratio for the type of aircraft concerned.

The position inboard of the length of wing may be in the fuselage of the aircraft.

The actuation means may be connected to the inboard end of the shaft to apply the torque T to this end.

In one possible embodiment, the outboard moment transfer means includes a planetary gearbox, including a planetary gear carrier, a ring gear, and a sun gear and:

the outboard end of the shaft is connected to the planetary gear carrier, operatively to transfer the torque T in the shaft to the planetary gear carrier;

the ring gear acts on the wing; and the sun gear acts on the aileron.

In the said possible embodiment, the sun gear may act on the aileron via a crank and linkage arrangement.

In another possible embodiment:

the outboard moment transfer means includes:
a first crank rotatably fixed to the outboard end of the shaft;
a second crank rotatably fixed to the aileron; and
a linkage interconnecting the first crank and the second crank;

the outboard end of the shaft is rotatably mounted to the wing; and the configuration of the cranks and linkage is such that, with the torque T applied to the first crank, the moment MW is induced in the wing by a couple generated by the cranks and linkage.

Further features of the invention will become apparent from the description below of two example embodiments of a wing control system, in accordance with the invention, with reference to and as illustrated in any of the accompanying diagrammatic figures. In the figures:

FIG. 5 shows a three dimensional, cutaway view of a part of a wing assembly of another aircraft, from an inboard forward position, and a second embodiment of a wing control system, in accordance with the invention, partially located in the wing.

Figure 1:
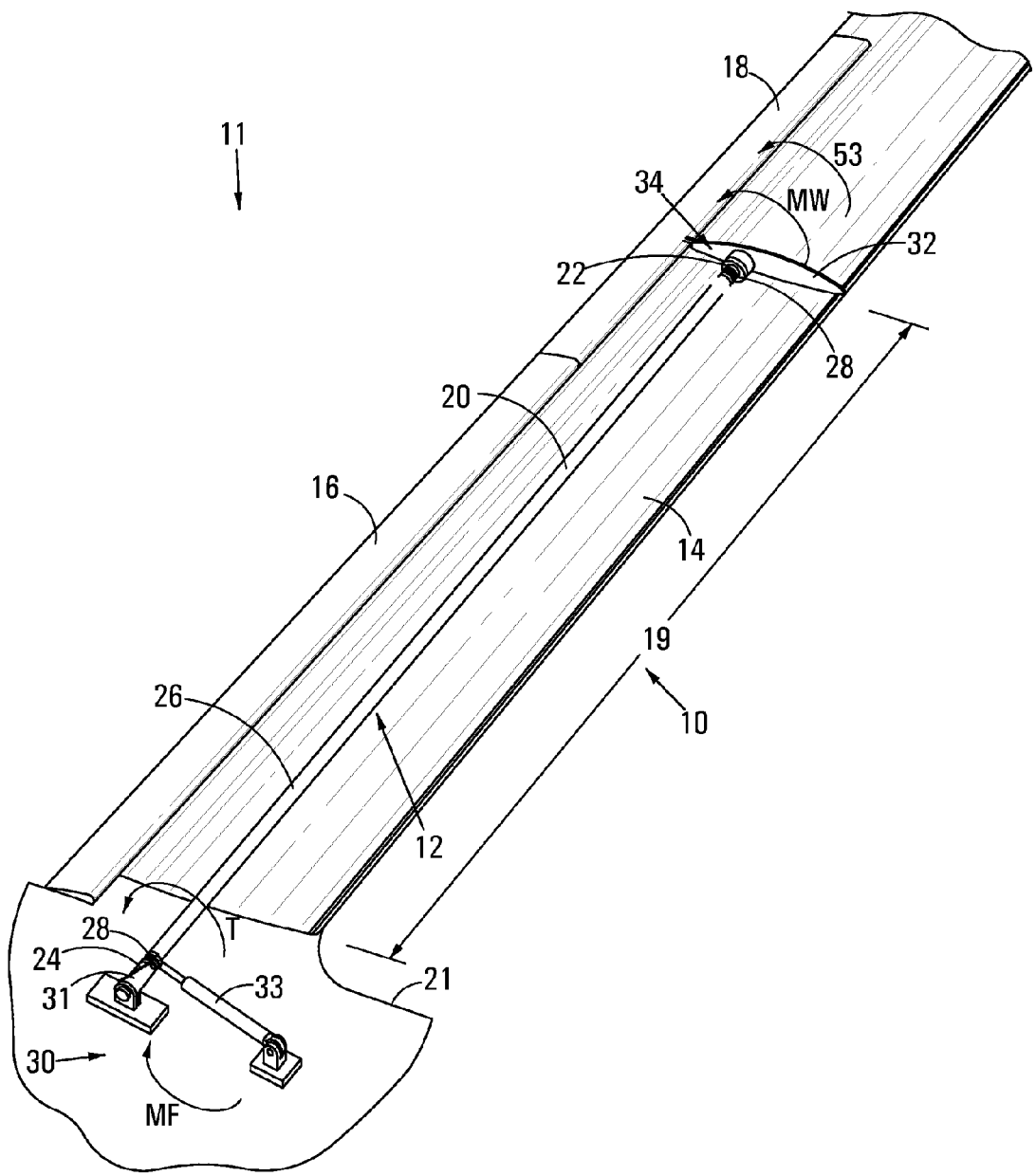
FIG. 1 shows a three dimensional, cutaway view of a part of a wing assembly of an aircraft, from an inboard forward position, and a first embodiment of a wing control system, in accordance with the invention, partially located in the wing.

With reference initially to FIG. 1, a wing assembly 10 (partially shown) of an aircraft 11 includes:

a wing 14, of which a top skin has been cut away in the Figure;

a flap 16;

an aileron 18; and a wing control system 12, in accordance with the invention.

The wing 14 includes a length of wing 19 in which dynamic air pressure on the aileron 18, when pivoted during forward motion of the aircraft (especially during flight), tends to induce twisting. As will be described hereinafter, the wing control system 12 serves to counter this tendency and to actuate the aileron 18.

The wing control system 12 includes a shaft 20 extending along the length of wing 19 and into a fuselage 21 of the aircraft. The shaft 20 includes a hollow torque tube 26 and two universal joints 28 at opposite ends of the tube 26. The shaft 20 has an outboard end 22 and an inboard end 24.

The wing control system 12 includes also actuation means 30 including:

a crank 31 mounted on the inboard end 24 of the shaft 20; and a hydraulic piston/cylinder 33 acting on the crank 31.

The hydraulic piston/cylinder 33 is responsive to aileron control inputs received from an aileron control system (not shown) of the aircraft 11.

Figure 2:
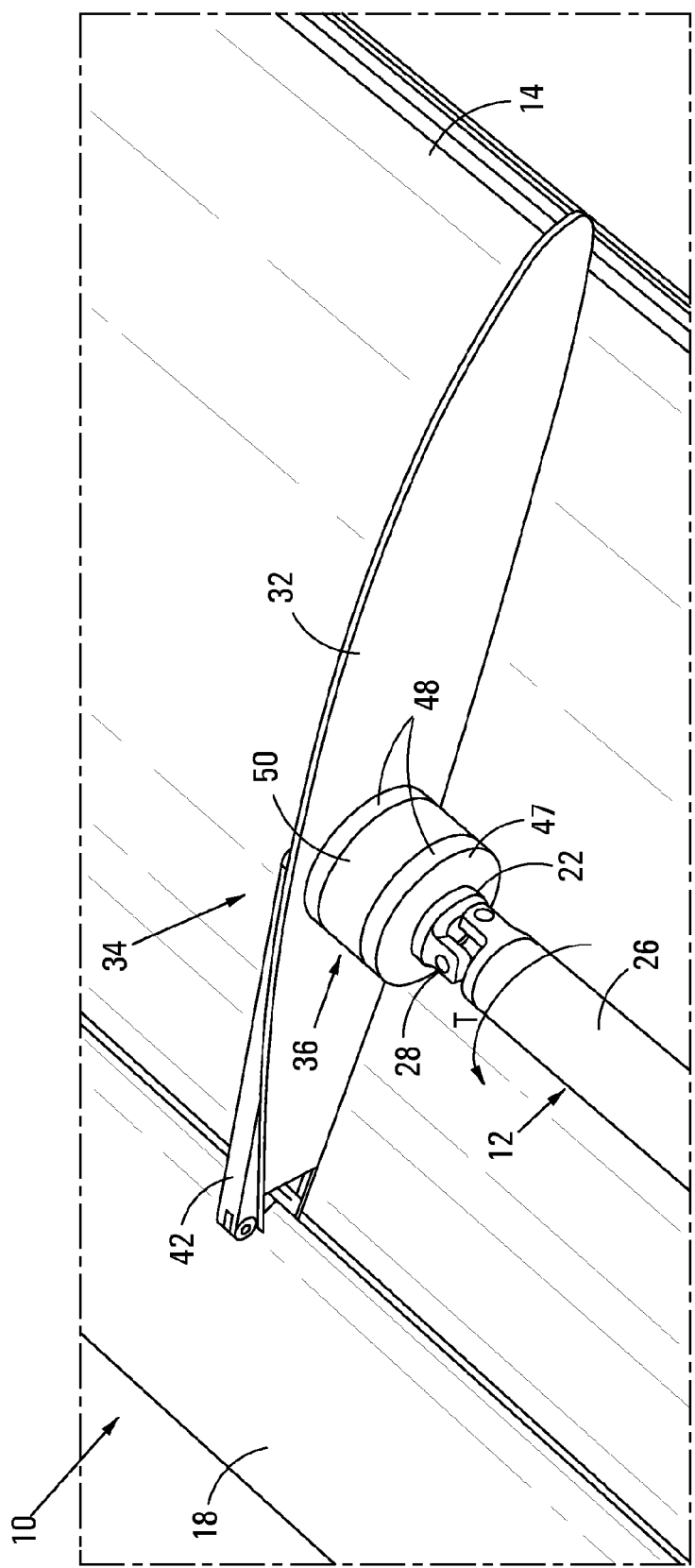
FIG. 2 shows an enlarged detail of a length of the wing assembly and wing control system of FIG. 1, from an inboard forward position.
Figure 3:
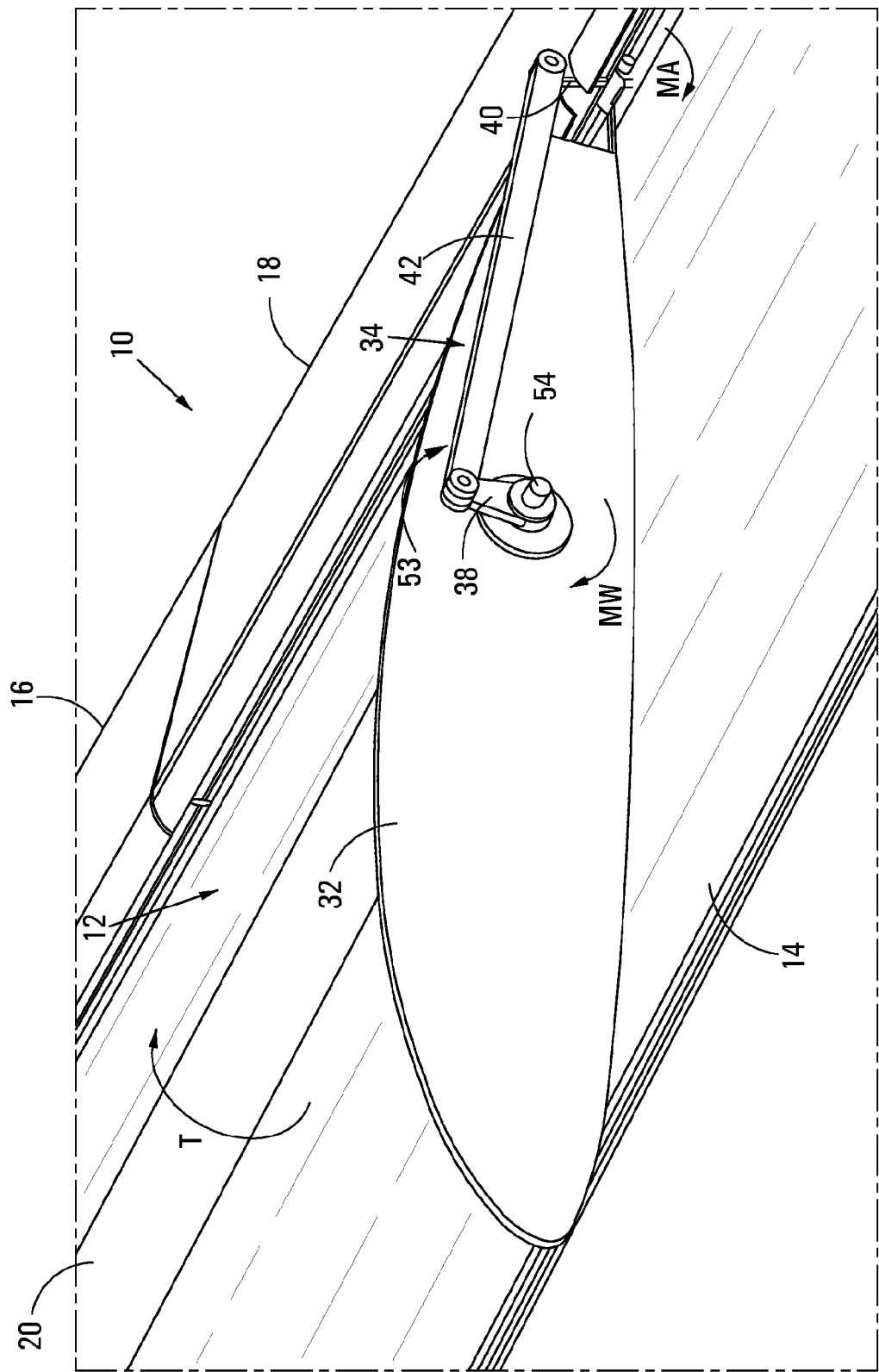
FIG. 3 shows an enlarged detail of essentially the length shown in FIG. 2, but from an outboard forward position.
Figure 4:
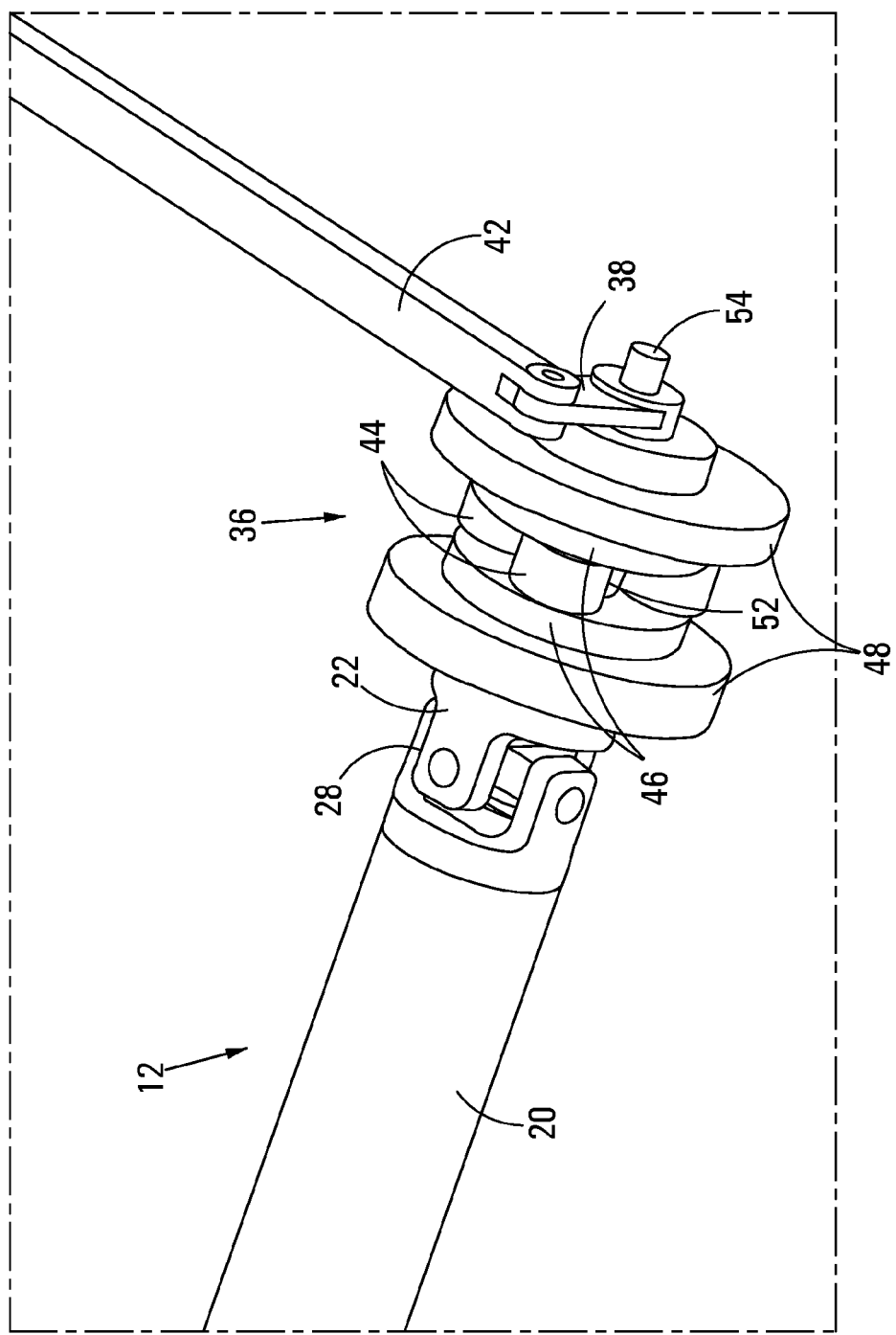
FIG. 4 shows an assembly which forms a part of the wing control system of FIG. 1.

With reference particularly to FIGS. 2, 3, and 4, the wing control system 12 includes also a stiffener web 32 within the wing 14 at an outboard end of the length of wing 19 and outboard moment transfer means 34 mounted to the stiffener web 32. The moment transfer means 34 includes a planetary gearbox 36, mounted to an inboard side of the stiffener web 32, and a crank and linkage arrangement, including cranks 38 and 40 and a linkage 42 interconnecting the cranks 38 and 40. In this example, the cranks 38 and 40 have substantially the same length. The crank 40 is fixedly connected to the aileron 18 to effect pivoting of the aileron 18.

The planetary gearbox 36 includes:

an arrangement of planetary gears 44 and a planetary gear carrier 46;

a ring gear assembly 47 including a ring gear 50 and two discs 48 on opposite sides of the planetary gear carrier 46; and a sun gear 52 having an axle 54 extending through the stiffener web 32.

In the planetary gearbox 36, the outboard end 22 of the shaft 20 is fixedly connected to the planetary gear carrier 46 and the ring gear assembly 47 is fixedly mounted to the web 32. The crank 38 is fixedly mounted to the axle 54, which, in turn, is fixedly connected to the sun gear 52.

In order to pivot the aileron 18 downwardly, in a rotational direction 53 (see FIG. 1), the hydraulic piston/cylinder 33 is extended to rotate the inboard end 24 of the shaft 20 in the direction 53 (as shown in FIG. 1). This induces a torque T in the shaft 20 and an opposite moment MF on the fuselage of the aircraft, which is inboard of the length of wing 19. The actuation means 30 thus also serves as inboard moment transfer means for transferring the torque T from the inboard end 24 of the shaft 20 to the fuselage 21 of the aircraft 11 as the moment MF. The moment MF thus balances the torque T.

Due to the configuration of the planetary gearbox 36, the torque T in the shaft 20 induces a moment MW on the ring gear assembly 47 and, accordingly, on the web 32 and a moment MA on the sun gear 52 and the axle 54, which moment MA is transferred by the cranks 38 and 40 and the linkage 42 to the aileron 18. The moment MA is approximately 0.25*T and the moment MW is approximately 0.75*T. The moment MW counters the moment induced by dynamic air pressure on the aileron 18. It thereby counters the tendency of the wing 14 to rotate in a rotational direction opposite to the direction 53 (as shown in FIG. 1), under dynamic air pressure on the aileron 18.

By suitably selecting the ratios of the planetary gearbox 36 and the relative lengths of the cranks 38 and 40, a suitable ratio of moments MA:MW may be achieved for the specific aircraft and required operating conditions. It is envisaged that the ratio of moments MA:MW may be within a range 1:2 to 1:8. This ratio may, more particularly, be within a range 1:2 to 1:6.

FIG. 5 shows a part of a wing assembly 110 including a second embodiment of a wing control system 112, in accordance with the invention. The wing control system 112 is an alternative to the wing control system 12 of FIGS. 1 to 4.

The wing assembly 110 includes many features similar or identical to features of the wing assembly 10 of FIGS. 1 to 4. Such features are generally again designated by the same reference numerals as before and a description of these features is not repeated below.

The wing control system 112 includes actuation means identical to the actuation means 30 described above. However, the wing control system 112 does not include a planetary gearbox.

The wing control system 112 includes outboard moment transfer means 56 including:

an axle 60 which is connected to the outboard end 22 of the shaft 20 and which is rotatably mounted to the stiffener web 32;

a crank 58 fixedly connected to the axle 60;

a crank 62 fixedly connected to the aileron 18 to effect pivoting of the aileron 18; and a linkage 64 interconnecting the cranks 58 and 62.

The crank 58 has a length of, say, four times that of the crank 62.

Upon rotation of the shaft 20 in the direction 53 under actuation of the actuation means at the inboard end of the shaft 20, the crank 58 is rotated along with the outboard end of the shaft 20. A torque T is induced in the shaft 20. A compressive force F1 is induced in the linkage 64. This force is transferred to the crank 62 and the aileron 18, causing a moment MA on, and downward pivoting of, the aileron 18.

A couple comprising force components F2 of the force F1 perpendicular to a line 66 interconnecting respective pivotal axes of the cranks 58 and 62 is transferred to the wing 14 via the cranks 58 and 62, inducing a moment MW on the wing 14. The moment MW may be varied by varying the relative lengths of the cranks 58 and 62 to achieve a required magnitude of the moment MW for countering the tendency of the wing 14 to rotate in the direction opposite to the direction 53 (see FIG. 1).

The above examples refer to downward pivoting of the aileron 18. The same applies mutatis mutandis in the case of upward pivoting of the aileron 18, in which case all displacements, moments, and forces referred to above are reversed.

The Applicant believes that the wing control system of the invention may provide an effective, economical, and reliable means for countering twisting of wings due to dynamic air pressure on ailerons. This has been borne out by wind tunnel testing performed by the Applicant.

The invention claimed is:

1. A wing control system operatively installed on an aircraft, the aircraft including a wing having a stiffener web at an outboard end thereof and an aileron, wherein a length of wing in which dynamic air pressure on the aileron, when pivoted during forward motion of the aircraft, would tend to induce twisting, the system including:

a shaft extending along the length of wing and including an outboard end and an inboard end;

actuation means comprising:

a crank mounted to the inboard end of the shaft; and an hydraulic piston/cylinder responsive to aileron control inputs received from an aileron control system of the aircraft and acting on the crank to induce a variable torque T in the shaft;

outboard moment transfer means operatively connected between the stiffener web, the outboard end of the shaft, and the aileron, wherein the outboard moment transfer means comprises:

a first crank rotatably fixed at its proximate end to the outboard end of the shaft;

a second crank rotatably fixed at its proximate end to the aileron; and a linkage interconnecting distal ends of the first crank and the second crank to each other, thereby to transfer the torque T from the outboard end of the shaft partially as a moment MA to the aileron via the first and second cranks and linkage, and partially as a moment MW to the wing via the connection of the stiffener web at an outboard end of the length of wing, with the moment MW being in the same direction as the moment MA to counter twisting of the length of wing due to the dynamic air pressure on the aileron, when pivoted during forward motion of the aircraft, and with the moments MA and MW together balancing the torque T; and inboard moment transfer means operatively connected between the inboard end of the shaft and a fuselage of the aircraft, wherein the inboard moment transfer means transfers the torque T from the inboard end of the shaft to the fuselage as a moment MF, with the moment MF being directionally opposite to the moments MA and MW and with the moment MF balancing the torque T.

2. A system as claimed in claim 1, in which the outboard moment transfer means is configured to operatively induce a ratio of moments MA:MW within a range 1:2 to 1:8.

3. A system as claimed in claim 1, in which the actuation means is connected to the inboard end of the shaft to apply the torque T to this end.

4. A system as claimed in claim 1, in which the outboard moment transfer means includes a planetary gearbox, including a planetary gear carrier, a ring gear, and a sun gear and in which:
   the outboard end of the shaft is connected to the planetary gear carrier, operatively to transfer the torque T in the shaft to the planetary gear carrier;
   the ring gear acts on the stiffener web of the wing; and
   the sun gear acts on the aileron.

5. A system as claimed in claim 4, in which the sun gear acts on the aileron via the crank and linkage arrangement.

6. A system as claimed in claim 1, in which:
   the outboard end of the shaft is rotatably mounted to the wing; and
   the configuration of the cranks and linkage is such that, with the torque T applied to the first crank, the moment MW is induced in the wing by a couple generated by the cranks and linkage.

* * * * *